3,504,423
APPARATUS AND METHOD FOR MAKING
ARTIFICIAL TREE BRANCHES
Arthur Kraszeski and Stephen D. Kent, Newburgh, N.Y.,
assignors to R. O. Kent Corp., New York, N.Y., a
corporation of New York
Filed Apr. 18, 1969, Ser. No. 817,525
Int. Cl. B23p 17/00, 19/04, 11/00
U.S. Cl. 29—419      36 Claims

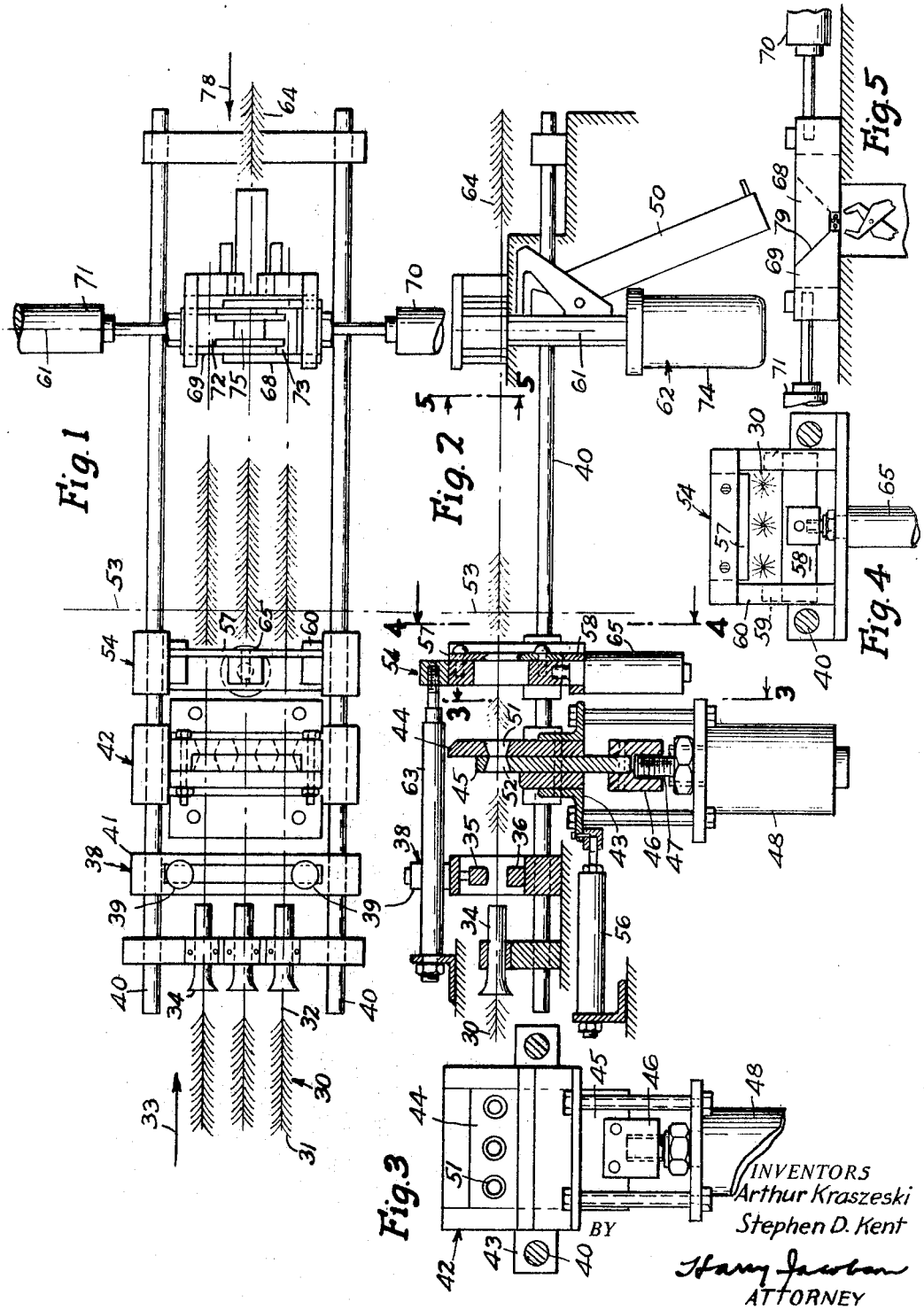

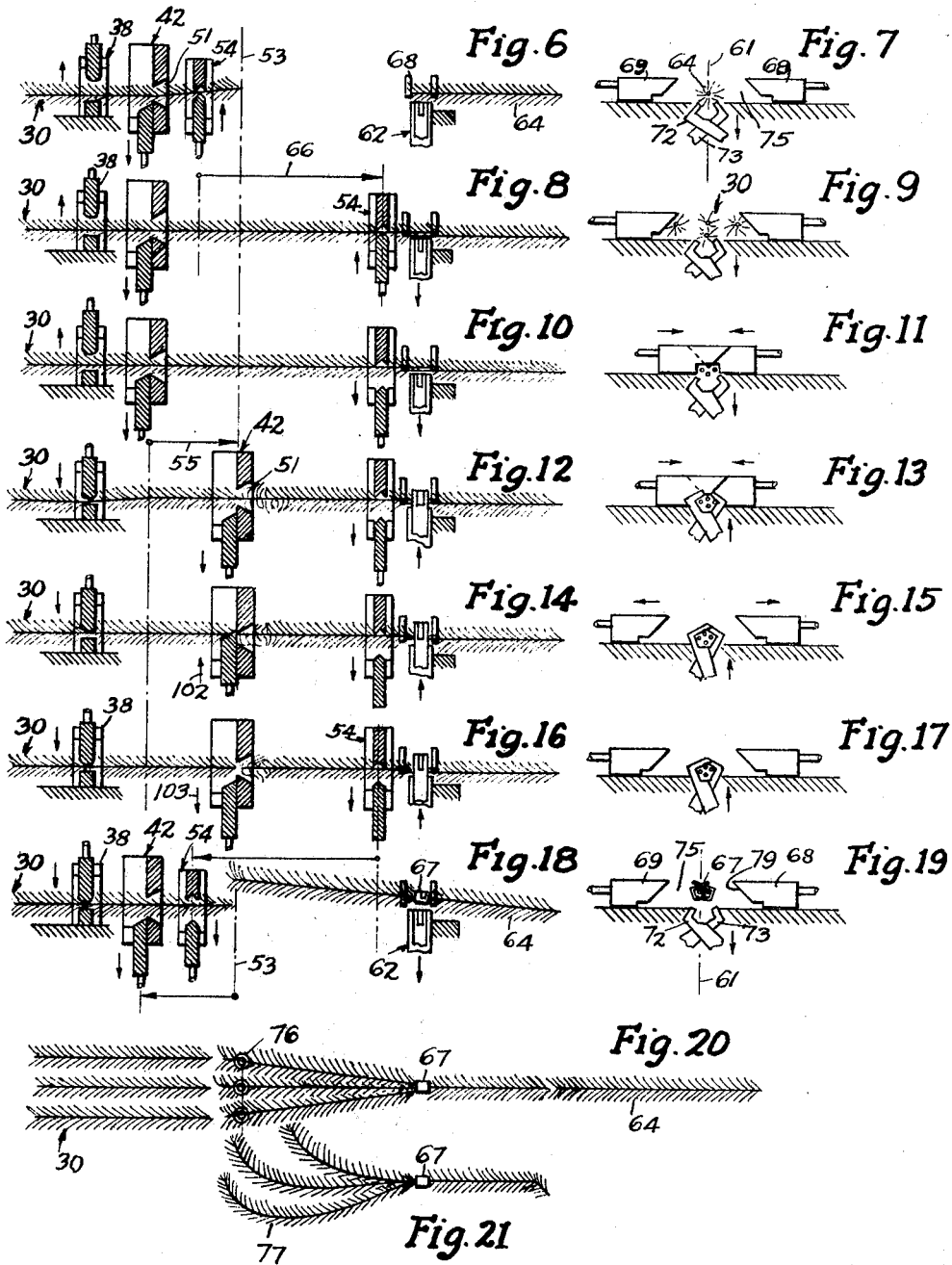

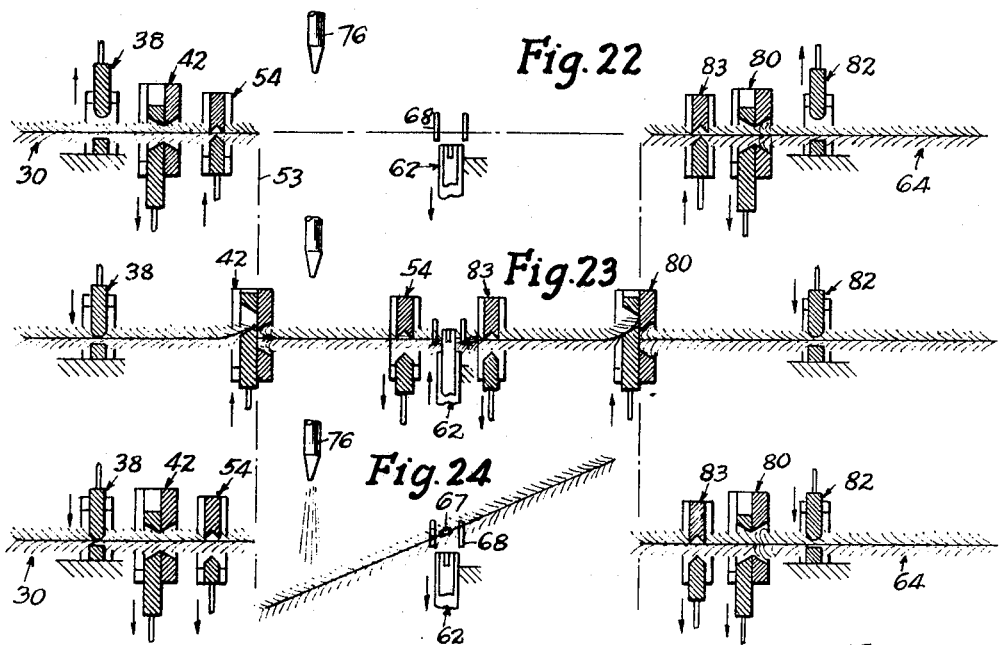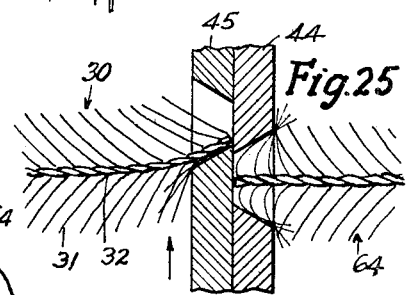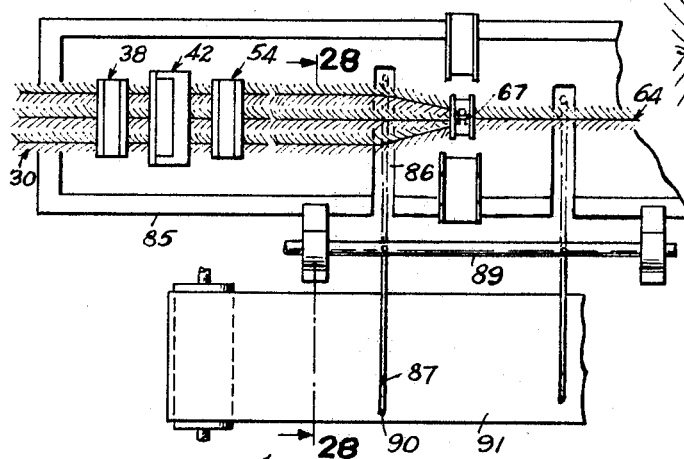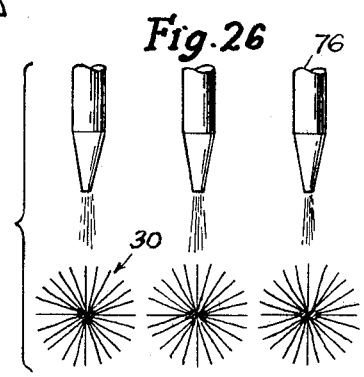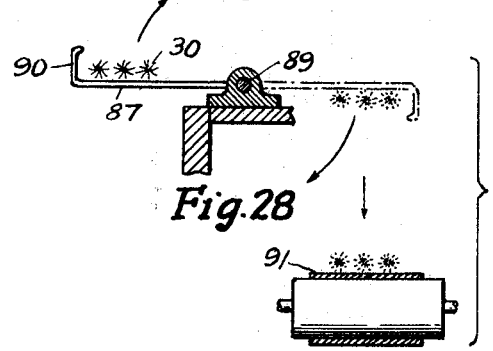

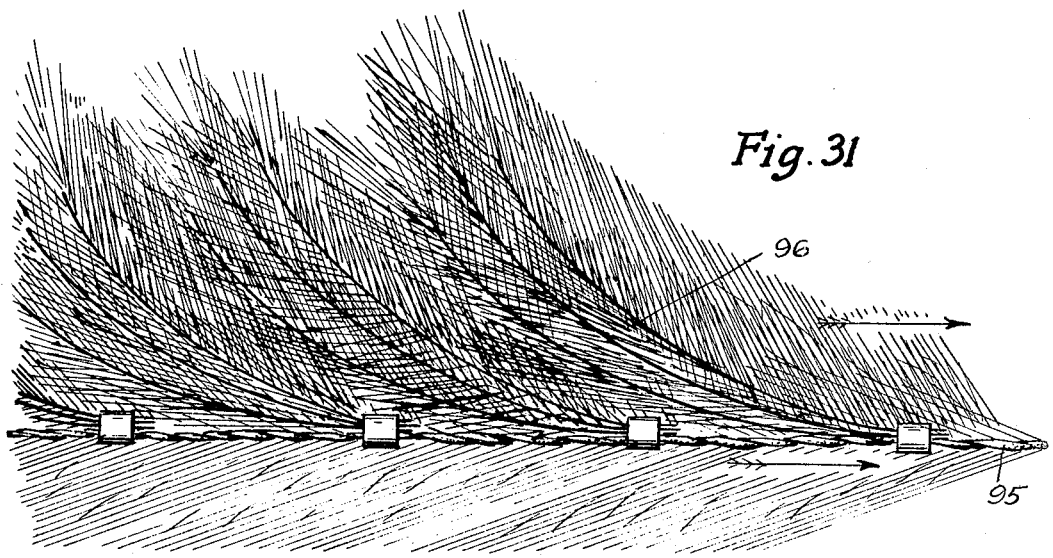
Fig. 31
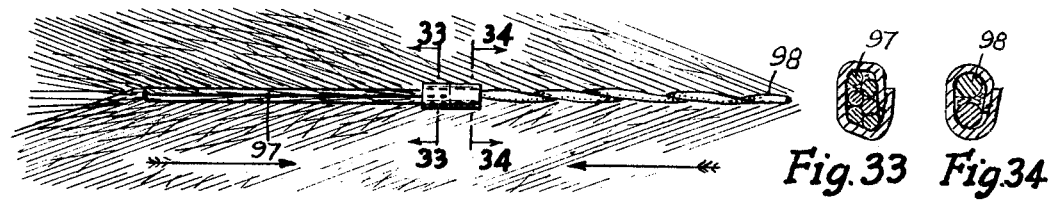
Fig. 32  Fig. 33  Fig. 34
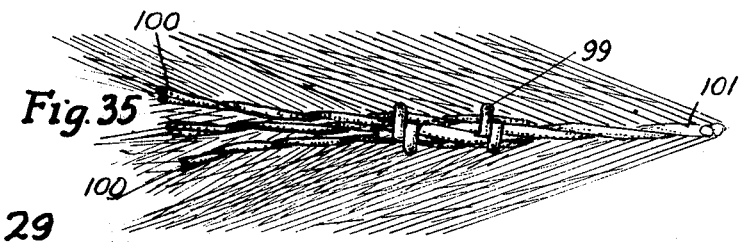
Fig. 35  Fig. 29
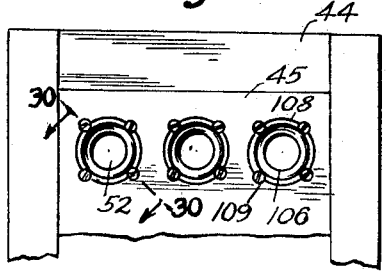
Fig. 30
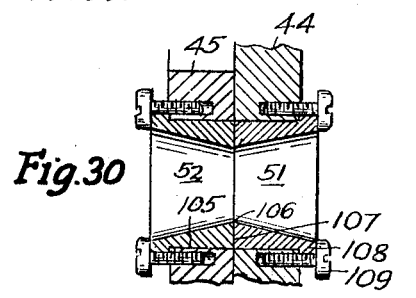
INVENTORS
*Arthur Kraszeski*
*Stephen D. Kent*
BY
ATTORNEY United States Patent Office 3,504,423
Patented Apr. 7, 1970

ABSTRACT OF THE DISCLOSURE

Simultaneously feeding a number of spaced apart long garlands until their ends are adjacent the end of a stem or limb garland, cutting garland twigs from the long garlands and fastening all the garland ends together to form a branch or limb. In the apparatus, a clamp, cutter and feeder are each made of two transversely reciprocating blades. The clamp and cutter also reciprocate longitudinally and re-engage the long garlands automatically after cutting. The cutter turns the needles on the end portions of the twig garlands out of the way and cuts the wires and a minimum number of needles. In the fully automatic machine, a single stem garland is moved to a point adjacent the twig garlands and is similarly fed and cut, the finished branch being automatically discharged from the machine. Optionally, a pre-cut or a long stem garland is manually arranged at the clipping station and the finished branch is manually removed.

DESCRIPTION

This invention relates to apparatus and a method for making the branches of artificial Christmas trees, and relates particularly to that type of such trees, the branches or limbs of which are made of garlands formed of wires and flexible needles twisted together.

It has been difficult in the past for machinery to manipulate such garlands without appreciable damage because of the fragility of the garland needles when they are unduly pressed or bent the wrong way and the necessity for inclining the needles projecting from the twigs on one side of the stem wire in a direction different from that of the needles on the twigs which are disposed on the other side of the stem wire. Consequently, it has been necessary heretofore to pre-cut the various garlands to the desired lengths before the assembly thereof. The major part of the assembling work required to make a branch having a set of twigs extending from a stem has therefore been done manually heretofore.

Pre-cutting garlands to twig and stem lengths automatically, has also been impractical because of the difficulties involved in automatically picking up one or more long flexible and relatively heavy garlands from a stored stack of such garlands. The spacing between long garlands in such a stack is not uniform owing to the partial crushing or bending of the needles caught between and becoming entangled with the wires of adjacent garlands. Great care must also be taken to prevent the garland needles from rubbing excessively against each other during the relative movements thereof and from being rubbed the "wrong way" when being automatically cut.

The difficulties mentioned have largely been overcome by the present invention wherein a number of pairs of relatively thin blades, one fixed and one movable transversely are employed to operate on the long garlands needed to make the branch or limb. One pair of such blades is used for safely feeding a set of long lengths of twig garlands past a cutting station until the leading ends of the garlands reach a fastening station in position for attachment to the end portion of a single stem garland. Another set of such blades is employed as cutting means to cut the garlands to length, and a third set as clamping means to hold the garlands against movement except during the advance thereof. A suitable fastening device tightly secures the garland ends together with a fastener after they have been bundled and then releases the thus secured branch for discharge from the machine.

The invention includes the safe advance of a long stem garland into the fastening station and the fastening together of the garlands before they are cut to lengths, as well as the discharge of the finished branch.

The invention is directed to the provision of apparatus and a method for safely advancing one or more long garlands into a position wherein the end portions thereof are fastened by a suitable fastener to the end portion of another garland, clamping the long garlands while they are being fastened and cutting them to a selected length, which can be changed if desired.

The invention is also directed to the bending or brushing aside of the needles on the end portions of the long garlands during the cutting operation to prevent such end needles from being cut off and lost.

The various objects of the invention will be clear from the following description and from the drawings, in which FIG. 1 is a top plan view of the machine.

FIG. 2 is an elevational view, with parts in vertical section.

FIG. 3 is a vertical sectional view of the machine taken on the line 3—3 of FIG. 2 and showing the cutting means for the set of twig garlands.

FIG. 4 is a similar sectional view of the machine taken on the line 4—4 of FIG. 2 and showing the feeding means for the twig garlands.

FIG. 5 is a similar sectional view of the machine taken on the line 5—5 of FIG. 2 and showing the fastening means.

FIGS. 6, 8, 10, 12, 14, 16, and 18 are respective diagrammatic vertical sectional views of the machine showing the various steps in the assembly and fastening of the garlands and the movements of the various clamping, feeding and cutting blades.

FIGS. 7, 9, 11, 13, 15, 17 and 19 are end elevational views of the fastening mechanism in the respective positions thereof shown in FIGS. 6, 8, 10, 12, 14, 16 and 18 respectively.

FIG. 20 is a top plan view of the twig garlands and the stem garland just after the garlands have been cut to size after being fastened.

FIG. 21 is a similar view of the branch showing the initially straight twigs bent and better separated from each other, and showing the free end of the stem garland bent into position for insertion into the trunk of an artificial tree.

FIG. 22 is a diagrammatic view similar to FIG. 6 showing in addition, the means for feeding, clamping and severing the stems from the stem garlands at the start of the cycle of operation of the machine.

FIG. 23 is a view similar to FIG. 16 showing also the severing step which cuts the stem to length.

FIG. 24 is a view similar to FIG. 18 showing the discharge of the fastened branch from the machine.

FIG. 25 is a fragmentary vertical sectional view of the cutter blades for the twig garlands, showing the needles at the cut end of a twig bent back by the fixed blade out of the path of the movable blade.

FIG. 26 is a diagrammatic side elevational view of one form of the means for discharging the fastened branch from the machine.

FIG. 27 is a fragmentary top plan view of another form of the means for discharging the branch.

FIG. 28 is a combined sectional and elevational view of FIG. 27.

FIG. 29 is a fragmentary elevational view of the cutting blades, showing the removable cutting dies.

FIG. 30 is an enlarged sectional view taken on the line 30—30 of FIG. 29.

FIG. 31 is an elevational view of another product of the machine called a "spoke" garland in which a long stem garland is attached to a number of sets of twig garlands.

FIG. 32 is an elevational view of another product of the machine wherein the end portions of the garlands are not overlapped.

FIG. 33 is a vertical sectional view taken on the line 33—33 of FIG. 32.

FIG. 34 is a similar view, the section being taken on the line 34—34 of FIG. 32.

FIG. 35 is an elevational view of another product of the machine showing hog rings fasteners.

In the embodiment of the invention shown by way of example and referring particularly to the semi-automatic form of the machine illustrated in FIGS. 1–19, the set of long twig garlands 30 are preferably of the known type comprising wire and colored plastic fringe twisted together to form flexible needles 31 supported by the wires 32. The garlands are fed simultaneously and preferably horizontally, in the direction of the arrow 33 of FIG. 1 through suitable flared tubes as 34 in sufficient transverse spaced relation to each other to avoid interference or damage to the relatively fragile needles.

When the end portions of the garlands reach a fastening station, the advance of the garlands is temporarily halted while the garlands are fastened to the end portion of a stem garland at said station.

CLAMP

During their advance the garlands pass between the movable upper blade 35 and the fixed lower blade 36 of a then open clamp 38. The upper blade is adapted normally to press the wires of the set of garlands 30 against the lower blade and to hold the garlands against movement except during the advance of the garlands. The lower end of the upper blade is preferably dull or slightly rounded to prevent crushing of and permanent damage to the needles it engages. Said upper blade is reciprocated vertically by the air cylinders 39, each actuated in the usual manner under the control of a suitable solenoid valve which is in turn energized by a suitable switch in a well known manner which needs no further description.

Both blades of the clamp are relatively thin to avoid material deformation of the garland needles. However, the cylinders 39 press the blades together under sufficient pressure to hold them in their predetermined transverse spaced relation during the reciprocatory movements of the cutter and feeder along and relatively to the garlands.

It will be understood that the blades 35, 36 need not be spaced apart a distance equal to the full overall diameter of the twig garlands. The needles 31 being readily flexible, they move easily toward their supporting wires when encountering the blades on the forward movement of the garlands since they are flexed in the general direction in which they are inclined. After passing the blades, the needles are released and owing to their resiliency, they spring back the needed relatively short distance to their normal positions. The long limb garlands do not move rearwardly at any time and consequently their needles are not disturbed by the clamp blades except during the advancing movement of the garlands from which the twigs are formed.

The frame 41 for the clamp is fixed to the rails 40 and serves to guide the blade 35 during its transverse reciprocation. The blades are normally spaced apart sufficiently to permit the needles of the twig garlands to pass safely therebetween and are sufficiently thin to engage a minimum number of needles while putting adequate holding pressure on the wires when in operative position.

In contrast to the longitudinal movement of the cutter and feeder, the clamp remains adjustably fixed to the rails 40 even while the twig garlands on the various other mechanisms are in motion along said rails. It serves to brake or prevent any motion of the garlands which may result from friction with moving parts during the retracting strokes of the feeder or cutter or resulting from the weight of the long twig garlands rearwardly of the clamp. Both blades 35, 36 are sufficiently wide to permit the passage therebetween of the selected number of spaced apart twig garlands making up the set to be advanced, cut and joined. The adjacent edges of said blades press primarily on a very short length of the wires 32 of each of the garlands when the blades are closed, whereby a minimum number of needles are caught between the blade edges and the garland wires.

CUTTER

From the clamp the garlands pass through the blades of a cutter 42. The frame 43 of said cutter is mounted for horizontal reciprocation on the rails 40. One blade 44 (FIG. 3) of said cutter is fixed to the frame while the other blade 45 is secured by the connection 46 to the piston rod 47 of the air cylinder 48. The cylinder reciprocates the movable blade vertically and in face to face contact with and transversely of the fixed blade. To permit the passage of the needles of the twig garlands therethrough as the garlands are advanced by the feeding means soon to be described while the cutting mechanism is open and at rest, the blades 44 and 45 are perforated by means of the similar tapered holes 51 and 52 respectively. The wall of the hole 52 bends the needles toward the wires of the garlands, in the direction in which the needles are readily flexible when the cutter is at rest and the garland ends are advanced to the cutting station. The smaller edges of the walls of the holes 51 and 52 are in registration or coincident with each other except during the cutting operation. Consequently, the holes taper in opposite directions. Said smaller or inner edges are suitably sharpened and constitute cutting edges whereby as the blade 45 slides against the face of the fixed blade, the wires of the garlands arranged in said holes 51 and 52 are cut. Such cutting of the twig garlands between the lower part of the wall of the hole 52 and the upper part of the wall of the hole 51 takes place at a cutting station indicated by the dash-dot line 53 of FIGS. 1 and 2.

Means are provided to reciprocate the cutter in the direction of the axes of the garlands in order first, on the advancing stroke, to move to the cutting station 53 at which the set of garlands is cut precisely to the proper length; second, to brush back the needles just in advance of the cutting edge of the cutter blade 45 so that such needles are not cut but are retained, and when released, hide the cut ends of the wires from which the uncut needles project; and third, to free the leading end portions of the long uncut twig garlands to the rear of the cutter on the retracting stroke of the cutter. As shown by the arrow 55 of FIG. 12, the cutter moves from a point on the rails 40 near the clamp 38 at the beginning of the cycle of operations to the cutting station 53 after the advance of the twig garlands the required distance past said station. The air cylinder 56 (FIG. 2) reciprocates the cutter horizontally during its advancing and retracting strokes, the cutter frame 43 sliding along and being guided by the rails 40.

As has been indicated, the garland needles 31 flex inwardly and rearwardly as they pass into and through the holes 51 and 52 during the advancing movement of the garland. The same type of bending occurs during the retracting movement of the cutter into its initial postiion, shown best in FIGS. 6, 8, 10 and 18, from the cutting station 53, the relative movement of the cutter and garlands being the same. However, during the advancing movement of the cutter from its normal position of FIG. 6 adjacent the clamp 38 and as shown by the arrow 55 of FIG. 12, the garlands are at rest. Hence the walls of the holes 51, 52 flex the garland needles forwardly and outwardly until they are released by the passage therepast of the cutting blades. At the cutting station as indicated in FIGS. 12, 14, 16 and 25, the bending of the needles forwardly removes them from the path of the cutting edges of the cutting blades and retains those end needles which would ordinarily be cut off as the wires of the garlands are severed. When the forwardly bent end needles are released and resume their normal positions they extend beyond and conceal the cut ends of the wires and appreciably better the appearance of the branch at the twig ends.

It will be understood that the leading end parts of the garlands are retained in the holes 51 and 52 of the blade 45 and are thereby automatically threaded into the cutter, whereby during the retracting movement of the cutter back to its initial position, the garlands have already been positioned in preparation for the next cycle and are aligned so that they are readily engaged by and automatically enter the space beween the blades of the retracting feeder 54. Preferably the retracting movement of the cutter is at a greater speed than that of the feeder so that the cutter moves out of the way of the feeder during the retracting strokes of both, whereby the feeder can readily reengage the long twig garlands rearwardly of the cutting station as will later be more fully explained.

FEEDER

Similarly to the clamp and cutter, the feeder 54 comprises a fixed blade 57 and a transversely movable blade 58 reciprocating vertically toward and from the fixed blade. The ends of the movable blade are inserted into and guided by a suitable groove 59 in the feeder frame 60.

To reciprocate the movable blade vertically, the air cylinder 65 is provided. The entire feeder including its operating power cylinder 60 is mounted on the rails 40 for horizontal reciprocation toward and from the banding station 61 at which the clipper 62 is arranged. Both blades 57 and 58 (FIGS. 2 and 4) of the feeder mechanism are quite thin and thinner than those of the clamp and cutter, whereby any appreciable number of needles adjacent the points of the garlands gripped by the blades are not likely to be permanently damaged. Movement of the feeder determines the length of the twig garlands for each cycle, the stroke of said mechanism being readily adjustable. The adjustment can be effected by halting the horizontal stroke of the feeder cylinder 63 at a predetermined point as by means of spacer rings, not shown, arranged at the rear end of its piston rod in a manner which is readily understood. Should the length of the stroke of the feeder be so adjusted, the fastening station should also be adjusted to the proper point so that the end portions of the twig garlands extending forwardly out of and a substantial distance beyond the feeder overlap the limb garland 64 sufficiently for fastening purposes. The length of the stroke is indicated by the arrow 66 of FIG. 8. To insure an adequate pressure grip upon the entire set of garlands, the blades are self-aligning. The upper edge of the movable blade is of inverted V-shape to co-act with a V-shaped recess in the lower edge of the fixed blade. Said blades are closed only during the advancing stroke of the garlands and are open during the retracting stroke of the feeder whereby the garlands remain undisturbed during said stroke. During the advancing stroke, the garlands are securely held for movement as a unit and against movement relatively to each other.

CLIPPER AND VISE

The fastening mechanism will now be described.

In the form shown, the fastener takes the form of a sheet metal clip 67 having a tongue on one edge entering a groove in the opposite edge. However, the fastener and the fastening device for clinching the fastener may take other known forms as will become clear, such as hog rings, straight edge clips or the like. For fastening or banding purposes, the ends of the twig garlands may overlap or abut against the ends of the stem garlands. As shown in FIGS. 1–20, the twig garlands are arranged in transverse spaced relation to each other. It is, therefore, advisable that the leading end portions thereof be compacted into a tight bundle with the adjacent end portion of the stem garland 64, to permit the fastener to be properly clinched around said bundle of end portions as shown in FIGS. 15, 17 and 19. Said end portions should overlap a distance slightly greater than the width of the clip 67 to permit the extreme ends of the garlands to project slightly beyond the edges of the clip and to make sure that the clip does not overhang any of the garland ends. At the clipping or banding station is arranged the telescoping vise jaws and a conventional clipper 62 of a well known type which first supplies a sheet metal clip from the magazine of such clips which it carries and seats the partly bent clip around the bundle of garland wires and then bends or clinches the clip into proper tightly clenched position around the bundle of overlapped garland ends. The vise jaws are arranged in pairs, the respective jaws of each pair being spaced apart longitudinally of the garlands. The outer pair 68 and the inner pair 69 telescope into each other and are drawn apart transversely by means of the respective power cylinders 70 and 71 as best seen in FIGS. 1 and 5. The vise jaws are suitably supported for sliding movement on the frame of the machine and are normally separated or open as shown in FIGS. 15, 17 and 19 sufficiently to permit the clip closing jaws 72 of the clipper 62 to be raised and inserted between the open jaws of the vise into clenching position and to band the garlands as shown in FIG. 17 at the proper time. The inner edge 79 of each vise jaw is inclined downwardly and outwardly and serves to cam the garland wires toward each other and downwardly thereby to squeeze the wires into a bundle when the vise closes prior to the banding operation (FIG. 5). The clipper jaws are reciprocated by the power cylinder 74 of the clipper 62 into and out of their fastening or banding position. Said clipper jaws 72, 73 automatically introduce an open clip, into the space 75 between each pair of the closed vise jaws, to the clipper jaws, then close to complete the bending of the partly bent clip around the overlapped garland ends. The clipper jaws are then retracted by their cylinder 74. After retraction of the clipper jaws, the clip remains tightly clamped on the garland ends and the jaws of the clipper are loaded in a lowered or retracted position with a new clip. A hopper 50 (FIG. 2) in the clipper is loaded manually with clips which are placed between the empty clipper jaws by a suitable known cam operated mechanism. Said clipper is of the type disclosed for example in Patents No. 3,068,485 and No. 3,133,288 to which reference is made for a detailed description.

After the garlands have been fastened or banded, the vise jaws open as shown in FIG. 15 and the clipper jaws retract in the direction of the vertical arrows of FIGS. 18 and 19 to the position shown in said figures. The twigs are cut from the twig garlands just as or after the clip is secured, the cut twigs having been released by the opening and retraction of the feeder blades and the cutter blades while the clamp blades remain closed upon the remainders of the long twig garlands. Opening of the various pairs of garland-engaging blades and the vise jaws frees the fastened and cut twigs from the long twig garlands ready for the discharge of the finished branch from the machine.

In the semi-automatic form of the machine now being described the operator merely lifts the clipped branch out of the open jaws of the vise as indicated in FIG. 18 by the tilted position of the branch. However, the branch may be discharged automatically by means of a suitable set of air blast nozzles 76 as shown in FIG. 26. Air is supplied to said nozzles from a suitable source of compressed air and delivered to them at the proper time to effect the automatic discharge of the branch and to clear the space forwardly of the cutting station so that the cycle of operations may be repeated. In this form of the machine, the stem garland 64 (FIG. 6) is precut to size and inserted manually into the open vise jaws as shown in FIGS. 6 and 7. It will be seen from FIG. 20 that in the form in which the branch is discharged, the twigs diverge outwardly somewhat from the clip which attaches them to the stem. However, the twigs may easily be shaped manually or mechanically to any desired configuration, as for example 77 into the curvilinear form shown in FIG. 21.

In the completely automatic form of the machine shown diagrammatically in FIGS. 22–24, the clamp 82, cutter 80, and feeder 83 are similar to and operate similarly to those shown in connection with the advance, cutting and banding of the twigs and in preferably the same sequence. It is advisable that the end portion of the long stem garland be inserted into the open jaws of the vise in a position wherein any interference of any twig garland with the end portion of the stem garland is avoided. This is easily done by the proper relative spacing of the holes in the cutters for the passage of the twigs and the stem.

Referring to FIGS. 22–24, the twig-forming mechanisms are shown in their starting positions at the beginning of the cycle precisely as in FIG. 6. The position of the corresponding stem forming mechanism is what may be termed a "right-hand" position as compared to the "left-hand" position of the twig-forming device. In other words, in view of the preferably, but not necessarily, opposite directions of the feed of the respective stem and twig garlands as shown by the arrows 33 and 78 of FIG. 1, the relative positions of the devices on opposite sides of the clipping stations, are reversed. Also, since a single stem garland is advanced, cut and secured or banded, only one hole is made in each of the blades of the stem cutter 80. The stem clamp 82 and the stem feeder 83 need not be changed in construction except for the widths thereof, from the twig clamp and twig feeder respectively. All the mechanisms of the twig forming devices and the stem-forming devices may be operated substantially simultaneously to the substantially same extent, so that the twig garland ends and the stem garland ends are properly positioned as by overlapping them to the required extent or abutting the ends of the twigs and the end of the stem in the vise, or slightly spacing said ends apart longitudinally.

It has been explained that the lengths of the twigs may be changed as desired by changing the length of the stroke of the feeder for the long twig garlands. The length of the stem may similarly be changed by changing the length of the stroke of the stem feeder. The amount the garland or garlands project beyond the feeder in the most advanced position of the feeder may also be adjusted by adjusting the advanced position of the feeder and its reciprocating cylinder along the rails 40.

The machine, whether fully automatic or semi-automatic, is capable of producing branches other than that shown in FIGS. 20 and 21.

In FIG. 31, the stem garland 95 is continuous and of any desired length. Twigs 96 are attached to the stem garland and are spaced apart preferably less than twig lengths. A branch so made is known as a "spoke" branch.

The stem garland in that case is quite flexible and is fed to the fastening station manually or automatically in the same general direction as the twig garlands and by similar means. The twig garland ends overlap the stem garland enough for adequate fastening by suitable fastening means, such as a rectangular clip, a tongued and grooved clip, hog rings or the like. In view of its flexibility, the stem garland need not be materially thicker, if at all, from the twig garland.

In FIGS. 32–34 is shown a limb or branch in which the end portions of the relatively thin twigs 97 substantially abut, rather than overlap, the end portion of the relatively thick stem 98. The clip shown is an initially rectangular clip of sheet material wide enough to encompass the end portions of the twigs and stem when bent thereabout, and if desired, to overlap at the edge portions of the clip.

In the form of the limb shown in FIG. 35, hog rings 99 are used to fasten together the end portions of the twigs 100 and the stem 101. It will be understood that in any of the forms of the fasteners, some of the needles inevitably become interposed between the fastener and the wires of the garland as well as between the twisted wires of the garlands themselves with resulting problems in the fastening operation.

Operation

The sequential operation of the various mechanisms is programmed by sequence relays such as timers and a stepping switch with a latching control system which insures that no operation can take place prior to the completion of the preceding operation. The electrical impulses are converted in the various solenoid air valves into pressure air flow which operates the cylinders in the desired sequence and repeats the cycle.

At the beginning of the cycle of operations, the parts are in the position shown in FIGS. 6 and 22 wherein the clamps are not closed on the garlands, the cutters have been retracted to points adjacent the clamps, and the feeders have also been retracted to points just forwardly of the cutters. The respective garlands extend through the clamps and cutters and each extends a predetermined distance beyond its feeder to the cutting station. The feeders have just been closed upon the garlands preparatory to the advance thereof. The clamps and cutters are open to permit such advance. The vise is open to receive in its space 75, the required lengths of the respective garland ends projecting beyond the feeders on the advance of the garlands. As shown in FIG. 7, the clipper jaws 72, 73 are open and down.

FIG. 8 shows the next step whereby the twig garland ends are inserted into the vise with or without the desired overlap of the end portions thereof over the end portion of the stem garland, the twig feeder 54 at this time advancing to the right (see arrow 66) and the stem feeder 83 (FIG. 23) advancing to the left. At the end of their advancing strokes, the feeders are adjacent the vise jaws 68, 69. In the case where the stem garland is manually inserted into the vise, as in FIG. 6, such insertion may be done prior to the advance of and out of the path of the twig garlands.

Proceeding to the next step shown in FIGS. 10 and 11, the feeders open and the vise closes upon the garland ends as shown by the horizontal arrows of FIG. 11.

Next as in FIGS. 12 and 13, after the advance of the garlands ceases, and the vise jaws 68, 69 have closed, the clamps 38 and 82 close, the clipper jaws move up, close, and band or fasten the garland ends, while the open cutters advance (arrow 55) to their respective cutting stations along the clamped garlands.

After the fastening of the garlands (FIGS. 14, 15 and 23) the cutters cut the clamped garlands to length as shown by the arrow 102 and the vise opens to release the banded garland ends.

Now as seen in FIGS. 16 and 17, the cutters open (see arrow 103) whereby at this stage, all the mechanisms, except the clamps 38, 82, release the garlands, the clipper jaws still being up and closed (FIG. 17). The feeders and cutters are ready to retract. The final steps are illustrated in FIGS. 18, 19 and 24. The open cutters retract rapidly to the initial positions of FIGS. 6 and 22, rethreading the garlands through the holes therein, followed by the feeder at a somewhat slower pace to avoid interference with the cutter. The garlands held in the holes of the cutters, pass between the blades of the feeders during the retraction, the feeders also returning to the initial positions thereof shown in FIGS. 6 and 22. The jaws of the clipper open and move down and release the garland ends whereby the branch formed of the fastened garlands becomes completely released. At this time the nozzles 76 are activated. Since the branch has been freed and is now unsupported except for whatever support is given by the open vise, the overbalanced and weighty twig end of the branch tilts downwardly and into the position shown in FIG. 24 so that the blast of air through the nozzles hastens the discharge of the twig from the machine. In FIG. 18, the nozzles are omitted and the branch is manually removed.

Immediately after the discharge of the branch and after the mechanisms have reached their initial positions, the cycle is automatically repeated.

A modified form of the automatic branch discharging means is shown in FIGS. 27 and 28. The machine frame 85 is cut away sufficiently as at 86 to permit the rotation of the branch-discharge arms 87 one revolution in a clockwise direction for each cycle as viewed in FIG. 28. Two or more of such arms are secured to and rotate with the one revolution shaft 89. Each arm ends in a suitable hook 90 whereby as the arms continue to rotate underneath and against the freed completed branch at the clipping station, the branch is lifted and carried by the arms to a discharge station above a suitable conveyor 91 on which the branch is dropped and carried off. The arms are halted at said station ready for the next cycle.

Referring to FIGS. 29 and 30, the garland cutter is designed for economical and efficient maintenance. For this purpose, each of the cutting edges of the blades 45, 44 is made at the inner end of a die-like insert arranged in a hole as 105 in the blade. The conical hole 51 or 52 is made in the insert, which may have a cylindrical outer surface to fit the hole 105. The operative portion of the cutting edge 106 at the inner end of the conical surface is easily changed by rotating the insert in its hole 105 to bring a different portion of the circular cutting edge into position to coact with a corresponding part of the cutting edge of the insert in the outer blade. After all parts of the cutting edges have become dull, the edge is quickly and easily sharpened by grinding the flat end surface 107 of the insert or the conical surface 51 or 52 or both.

The die insert has an end projecting flange 108 adapted to position the insert properly. The heads of the screws 109 engage the outer end surface of the insert and press the latter removably into its operative position, whereby the insert is readily removable for sharpening, adjustment or replacement.

It will now be seen that there has been provided apparatus and a method for cutting, assembling and fastening a number of twigs with a stem under full automatic control and in such a manner that a minimum amount of garland material is employed: that the garlands may be automatically clipped together after being squeezed into a bundle; that the long garlands need not be cut to length until they are fastened or banded, and that the various objects of the invention have been adequately attained.

While certain specific forms of the invention have herein been shown and described, various obvious changes may be made therein without departing from the spirit of the invention defined in the appended claims.

We claim:
1. In a machine for making artificial tree branches of garlands formed of twisted wires and flexible needles, garland feeding means for advancing the leading end portion of a relatively long twig garland past a cutting station and into a fastening station adjacent the end portion of a stem garland arranged at said station, cutting means to cut the twig garland, and fastening means at the fastening station to secure the end portions of the garlands together by clamping an encompassing fastener around said end portions.

2. The machine of claim 1, and means for squeezing together and holding said end portions of the twig and stem garlands until the said end portions have been secured by the fastening means.

3. The machine of claim 2, the garland squeezing and holding means comprising two pairs of jaws, the jaws of each pair being spaced apart longitudinally and cooperating with the corresponding jaws of the other pair, the fastening means being movable into and out of the space between the jaws of each pair.

4. The machine of claim 1, the cutting means comprising a transversely reciprocating blade and a fixed blade, each of the blades having a hole therein for the passage therethrough of the twig garland, the innermost edges of the walls of the respective holes constituting the cutting edges of the blades.

5. The machine of claim 4, said walls tapering inwardly to said cutting edges, the wall of the fixed blade bending the garland needles out of the path of said edges.

6. The machine of claim 4, means for longitudinally reciprocating the cutting means, means for reciprocating the movable blade in face to face relation to the fixed blade thereby to carry the hole therein past the hole of the fixed blade, said movable blade reciprocating means when at rest normally aligning the corresponding holes of the blades coaxially whereby the twig garland passes through and is guided by the walls of the holes during the advance of the garland and the cut end of said garland is maintained in substantially axial alignment with the feeding means during the retracting stroke of the cutting means.

7. The machine of claim 1, means to reciprocate the feeding means, means to reciprocate the cutting means as a unit toward and from a cutting station to alternately bend forwardly and to release the outer parts of the flexible needles of the twig garland; the cutting means and the feeding means being adjustable relatively to each other and relatively to the cutting station to vary the length of the twigs and to vary the distance the garland projects beyond the feeding means during the advance of the garland, the needles at the cutting station remaining bent during the time that the cutting blades remain at said station and then become released when the cutting means is retracted by the reciprocating means therefor.

8. The machine of claim 1, means to reciprocate the cutting means toward and from a cutting station, said cutting means bending and retaining bent the garland needles on the leading side of the cutting means out of the transverse cutting path of said means during the cutting of the garlands.

9. The machine of claim 1, the twig garland feeding means advancing said garland in one direction, stem garland feeding means arranged forwardly of the fastening station and similar to the twig garland feeding means for advancing a stem garland in the opposite direction to the fastening station, and a second cutting means similar to the first mentioned cutting means to cut the stem garland to a predetermined length at a second cutting station arranged forwardly of the fastening station.

10. The machine of claim 1, the garland feeding means advancing simultaneously a set of twig garlands in transverse spaced relation to each other, the cutting means cutting all the garlands of said set simultaneously, and the fastening means fastening the end portions of said set to the end portion of the stem garland.

11. The machine of claim 10, the feeding means advancing the leading end portions of the set of garlands into overlapping relation to the end portion of the stem garland at the fastening station.

12. The machine of claim 1, and means for clamping the garlands against movement except during the garland advancing stroke of the feeding means.

13. The machine of claim 12, the garland-clamping means comprising a pair of cooperating relatively thin blades, one of said blades being reciprocated to carry the wires of the garlands into pressed contact with the other blade, the blades being normally separated during the advancing movement of the garlands to permit the safe passage of the needles therebetween.

14. The machine of claim 12, the cutting means, the feeding means and the clamping means each comprising a fixed blade and a transversely movable blade, means to reciprocate the feeding means to and from the cutting station, means to reciprocate the cutting means to and from the cutting station in timed relation to the feeding means, garland squeezing means at the fastening station to bundle the end portions of the garlands, means to open and close the garland squeezing means, and means to move the remainder of the fastening means other than the garland squeezing means into and out of the fastening station.

15. The machine of claim 1, the feeding means comprising a relatively thin fixed blade and a relatively thin movable blade cooperating with the fixed blade to grip the wires of the garland therebetween, means for transversely reciprocating the movable blade, and means for reciprocating the feeding means as a unit during the garland advancing stroke thereof and while the blades grip the garland, and to retract the blades during the return stroke while the feeding blades are separated and release the garland arranged therebetween.

16. The machine of claim 15, means for clamping the garland against movement except during the advancing stroke of the feeding means, comprising a pair of cooperating blades, one of said blades being reciprocated to press the garland wires between the blades, said blades being normally separated sufficiently during the advancing movement of the garland to permit the safe passage of the garland needles therebetween, garland squeezing and holding means at the fastening station comprising two pairs of telescoping jaws, the fastening means including a clipper movable toward and from said jaws to position and to bend a clip about the end portions of the garlands, the stroke of the feeding means being adjustable.

17. The machine of claim 1, means for arranging the end portion of a stem garland at the fastening station comprising stem garland feeding means, and a second cutting means for the stem garland, said second cutting means and the stem garland feeding means being on that side of the clipping station opposite to the twig garland feeding and cutting means.

18. The machine of claim 17, and means for discharging the fastened garlands from the machine.

19. In a machine for making artificial tree branches of garlands formed of twisted wires and flexible needles, garland feeding means for advancing the leading end portion of a relatively long twig garland a controlled distance past a cutting station, and cutting means at said station for cutting said garland comprising a fixed blade having a hole therethrough for the passage of the garland, the innermost edge of the wall of the hole constituting the cutting edge of the blade, a movable blade in face to face relation to the fixed blade and having a similar hole therethrough arranged normally coaxially of the hole in the fixed blade, and means for reciprocating the movable blade to carry the cutting edge thereof past the cutting edge of the fixed blade.

20. The machine of claim 19, means for longitudinally reciprocating the cutting means toward and from the cutting station, the walls of the holes engaging, bending and retaining bent, those garland needles on the leading side of the cutting means, during the stroke of the movable blade, thereby to turn said needles out of the path of the movable blade.

21. The machine of claim 20, the walls of the holes tapering inwardly toward each other.

22. The machine of claim 21, the cutting edge of each of the blades being on a separate die member, and means for removably securing the die member to the remainder of the blade.

23. The machine of claim 19, the feeding means advancing a set of twig garlands simultaneously and in sufficient transverse spaced relation to each other to avoid material interference of the needles of one garland with those of adjacent garlands, the blades of the cutting means each having one of said cutting-edges for each of the garlands.

24. The machine of claim 19, and means to clamp the garland against movement during the cutting stroke of the movable blade by pressure on the wires of the garland.

25. The machine of claim 17, and means for clamping the respective garlands against movement except during the advance thereof by the respective feeding means therefor.

26. The method of making an artificial tree branch comprising feeding a number of lengths of twig garlands of twisted wire and flexible needles simultaneously in transverse spaced relation to each other to arrange the end portions thereof at a fastening station, arranging a stem garland with one end portion thereof at said station and with the stem garland substantially parallel to the twig garlands, fastening together the end portions of the garlands at the fastening station, and cutting the twig garlands at a cutting station to free twigs from said lengths.

27. The branch making method of claim 26, feeding a length of stem garland in the opposite direction to the feed of the twig garlands to arrange the stem garland into position for fastening, and cutting said stem garland to free a stem therefrom and to complete the branch.

28. The branch making method of claim 26, the end portions of the twig garlands being fed into overlapping relation to the end portion of the stem garland.

29. The branch making method of claim 26, the fastening step comprising securing the end portions of the garlands together with an encompassing fastener.

30. The branch making method of claim 26, and clamping the garlands against movement except during the feeding movement thereof to the fastening station.

31. The branch making method of claim 27, maintaining the twig garlands against movement relatively to each other during the feeding movement thereof to the fastening station whereby the garlands are movable longitudinally without damage to the needles, and overlapping the end portion of the stem garland with the end portions of the twig garland prior to the fastening and cutting of said garlands.

32. The branch making method of claim 26, the fastening of the garlands comprising bending and clinching a sheet metal clip around overlapped end portions of the twig and stem garlands while said end portions are squeezed and bunched together into substantially parallel relation.

33. The method of making an artificial tree branch comprising longitudinally advancing a set of substantially straight and relatively long garlands longer than the twigs to be cut therefrom in transverse spaced relation to each other past a cutting station to arrange the end portions of the garlands at a fastening station adjacent the end portion of a stem-forming garland, fastening the end portions of the garlands with a clip while bunching said portions together, and severing twigs simultaneously at the cutting station from said set of garlands.

34. The branch making method of claim 33, overlapping the end portions of the twig garlands and the stem garland, and clamping the set of garlands against relative movement with respect to each other.

35. The branch making method of claim 34, advancing a stem-forming garland in a direction opposite to the direction of advance of the set of garlands, and severing a stem from the stem-forming garland at a second cutting station while clamping the stem-forming garland against movement.

36. The branch making method of claim 34, the fastening of the garlands being performed prior to the severing of the twigs.

References Cited

UNITED STATES PATENTS

| | | | |
|---|---|---|---|
| 3,244,577 | 4/1966 | Raymond | 161—22 |
| 3,365,529 | 1/1968 | Dieffenbach | 264—322 |
| 3,380,487 | 4/1968 | Kraszeski et al. | 140—149 |
| 3,459,243 | 8/1969 | Dieffenbach | 140—149 |

THOMAS H. EAGER, Primary Examiner

U.S. Cl. X.R.

29—208, 243.56, 429